US008077281B2

(12) United States Patent
Taniguchi et al.

(10) Patent No.: US 8,077,281 B2
(45) Date of Patent: Dec. 13, 2011

(54) LIQUID CRYSTAL DEVICE

(75) Inventors: Hironori Taniguchi, Tottori (JP); Shinichiro Tanaka, Tottori (JP)

(73) Assignee: Sony Corporation, Tokyo (JP)

( * ) Notice: Subject to any disclaimer, the term of this patent is extended or adjusted under 35 U.S.C. 154(b) by 368 days.

(21) Appl. No.: 12/369,830

(22) Filed: Feb. 12, 2009

(65) Prior Publication Data

US 2009/0244468 A1 Oct. 1, 2009

(30) Foreign Application Priority Data

Mar. 27, 2008 (JP) ................................ 2008-082828

(51) Int. Cl.
*G02F 1/1343* (2006.01)

(52) U.S. Cl. ....................................................... 349/141

(58) Field of Classification Search ........................ None
See application file for complete search history.

(56) References Cited

U.S. PATENT DOCUMENTS 6,459,464 B1 * 10/2002 Nakasima et al. ............ 349/141
7,859,630 B2 * 12/2010 Wakabayashi ................ 349/141
2006/0146253 A1 * 7/2006 Kang ............................ 349/141
2007/0002247 A1 * 1/2007 Lee ............................... 349/141
2007/0195250 A1 * 8/2007 Onogi et al. .................. 349/141
2007/0216841 A1 * 9/2007 Konno .......................... 349/141
2008/0074602 A1 * 3/2008 Arai et al. ..................... 349/146

FOREIGN PATENT DOCUMENTS

JP 2007-256905 10/2007

* cited by examiner

*Primary Examiner* — Thanh-Nhan Nguyen
(74) *Attorney, Agent, or Firm* — K&L Gates LLP

(57) ABSTRACT

A liquid crystal device includes a liquid crystal layer between a pair of substrates. One substrate includes pixel electrodes, an insulating layer and a common electrode having a plurality of slits. An electric field between the pixel and common electrodes turns liquid crystal molecules in a predetermined direction in regions corresponding to the slits. Each slit includes a first straight portion extending from a center of the pixel electrode toward both sides of the pixel electrode and second straight portions extending from the ends of the first straight portion to the outside of the pixel electrode. The first and second portions each form an acute angle with an initial orientation of the liquid crystal molecules in a direction opposite to the predetermined direction. The acute angle between the second portions and the initial orientation is larger than the acute angle between the first portion and the initial orientation.

3 Claims, 5 Drawing Sheets

1
12
44 42 43
III
33a
16
45
19
18
11
41
Rb
41
411
41a
411e
412
411e
11e
Y
412
412
11e
X
412
411e
11c
III
411
411e
14

1
25
51
52
53
34
33
36
32
31
24
11
41
41a
41
41a
36a
18
19
45
16
44
42
43
12
22
23
21

LIQUID CRYSTAL DEVICE

BACKGROUND

1. Technical Field

The present invention relates to a liquid crystal device.

2. Related Art

A known liquid crystal device disclosed in, for example, Japanese Unexamined Patent Application Publication No. 2007-256905 has the structure including a liquid crystal layer disposed between a pair of substrates. One of the substrates has a plurality of pixel electrodes provided for respective pixels. The pixel electrodes are covered with an insulating layer. On the insulating layer, a common electrode having a plurality of slits is formed over the plurality of pixels. The common electrode and the pixel electrodes generate an electric field therebetween. The electric field turns liquid crystal molecules of the liquid crystal layer in a predetermined direction from an initial orientation in the regions corresponding to the slits.

In the known liquid crystal device, undesirably, there occur regions where the electric field E generated between the common electrode 41 and the pixel electrodes 11 is tilted in opposite directions in regions corresponding to the slits 41*a* such that the electric field E at both sides 11*e* of the pixel electrode 11 is tilted in a direction opposite to the direction in which the electric field E around the center 11*c* of the pixel electrode 11 is tilted, as shown in FIGS. 5A and 5B.

The slit 41*a* of the common electrode 41 has a straight portion 41*s* extending in the direction in which the slit extends. The straight portion 41*s* is generally formed so as to extend substantially along the initial orientation D of the liquid crystal molecules M, but forming a small angle with the initial orientation D of the liquid crystal molecules M. For example, the straight portion 41*s* of the slit 41*a* has a small angle in a positive direction with respect to the initial orientation D of the liquid crystal molecules M. In this instance, at the center 11*c* of the pixel electrode 11 in the region corresponding to the slit 41*a*, the electric field E is oriented in a direction substantially perpendicular to the straight portion 41*s* of the slit 41*a*, and thus the electric field E has an angle in a negative direction.

At the sides 11*e* of the pixel electrode 11 in the region corresponding to the slit 41*a* of the common electrode 41, the pixel electrode extend in the direction substantially perpendicular to the initial orientation D of the liquid crystal molecules M. Consequently, there is produced a revere tilt domain R at both sides 11*e* of the pixel electrode 11. In the reverse tilt domain, the electric field is oriented in a positive direction, hence in the opposite direction to the orientation of the electric field E at the center 11*c* of the pixel electrode 11.

In the reverse tilt domain R, when an electric field E is generated, the liquid crystal molecules M are turned in a direction RI opposite to the direction RD in which the liquid crystal molecules M around the center 11*c* of pixel electrode 11 are turned from the initial orientation. Accordingly, in the reverse tilt domain R, the liquid crystal molecules M are oriented in a different direction from the direction around the center 11*c* of the pixel electrode 11 when an electric field E is generated. Consequently, the quality of displayed images is degraded.

SUMMARY

An advantage of some aspects of the invention is that it provides a liquid crystal device which reduces the occurrence of a reverse tilt domain and thus displays high-quality images.

According to an aspect of the invention, a liquid crystal device is provided which includes a liquid crystal layer containing liquid crystal molecules and a pair of substrates between which the liquid crystal layer is disposed. One of the substrates includes pixel electrodes corresponding to a plurality of pixels, an insulating layer covering the pixel electrodes, and a common electrode having a plurality of slits, spreading over the plurality of pixels on the insulating layer. The pixel electrodes and the common electrode generate an electric field therebetween. The electric field turns the liquid crystal molecules in a predetermined direction from an initial orientation in the regions corresponding to the slits. Each slit includes a first straight portion extending from a position corresponding to the center of the pixel electrode toward positions corresponding to both sides of the pixel electrode inward the region of the pixel electrode and second straight portions extending from the ends of the first straight portion to the outside of the region of the pixel electrode. The first straight portion and the second straight portions each from an acute angle with the initial orientation in a direction opposite to the predetermined direction in which the liquid crystal molecules are turned. The acute angle formed between the second straight portions and the initial orientation is larger than the acute angle formed between the first straight portion and the initial orientation.

In the liquid crystal device thus structured, the angle formed between the electric field generated in a direction substantially perpendicular to the direction of the second straight portion in the region corresponding to the second straight portion and the initial orientation of the liquid crystal molecules is smaller than the angle formed between the electric field generated in a direction substantially perpendicular to the direction of the first straight portion in the region corresponding to the first straight portion and the initial orientation.

When an electric field is generated between the common electrode and the pixel electrodes, the liquid crystal molecules turn to the direction of the electric field at an angle as small as possible from the initial orientation. Also, as this angle is reduced, the liquid crystal molecules are more tightly oriented to the direction of the electric field.

Accordingly, the force to align the liquid crystal molecules to the direction of the electric field in the region corresponding to the second straight portion becomes larger than that in the region corresponding to the first straight portion. In addition, in the region corresponding to the second straight portions, many liquid crystal molecules M oriented in the direction substantially perpendicular to the second straight portion present in the longitudinal direction of the second straight portion.

Therefore, even if the electric field around both sides of the pixel electrode is oriented in the direction opposite to the direction of the electric field in the region corresponding to the first straight portion, many liquid crystal molecules oriented in the direction substantially perpendicular to the second straight portion prevent the liquid crystal molecules in the regions corresponding to the sides of the pixel electrode from turning in the direction opposite to the direction in which the liquid crystal molecules in the region corresponding to the first straight portion turn.

Thus, an embodiment of the invention can reduce the reverse tilt domain and the liquid crystal device can display high-quality images.

Preferably, the direction of the electric field in the region corresponding to the first straight portion is substantially perpendicular to the direction in which the first straight portion extend, and the direction of the electric field at least at the first straight portion side in the regions corresponding to the second straight portions is substantially perpendicular to the direction in which the second straight portions extend.

In this structure, the liquid crystal molecules in the regions corresponding to the second straight portions can be oriented in the direction substantially perpendicular to the direction in which the second straight portion extends by a larger force than the force to align the liquid crystal molecules in the region corresponding to the first straight portion, even if reverse tilt domains are produced around both sides of the pixel electrode in the region corresponding to the slits of the common electrode. Consequently, the reverse tilt domain is restricted in the regions corresponding to the second straight portions. Thus, the reverse tilt domain can be reduced more than ever and the liquid crystal device can display high-quality images.

Preferably, the slits have the same shape and are arranged at regular intervals in the direction substantially perpendicular to the initial orientation.

Thus, the slits are efficiently formed in the common electrode. Consequently, the area of the slits or openings of the common electrode is increased, so that many of the liquid crystal molecules can be oriented by the electric field generated between the pixel electrodes and the common electrode. Thus, the liquid crystal device can enhance the quality of displayed images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
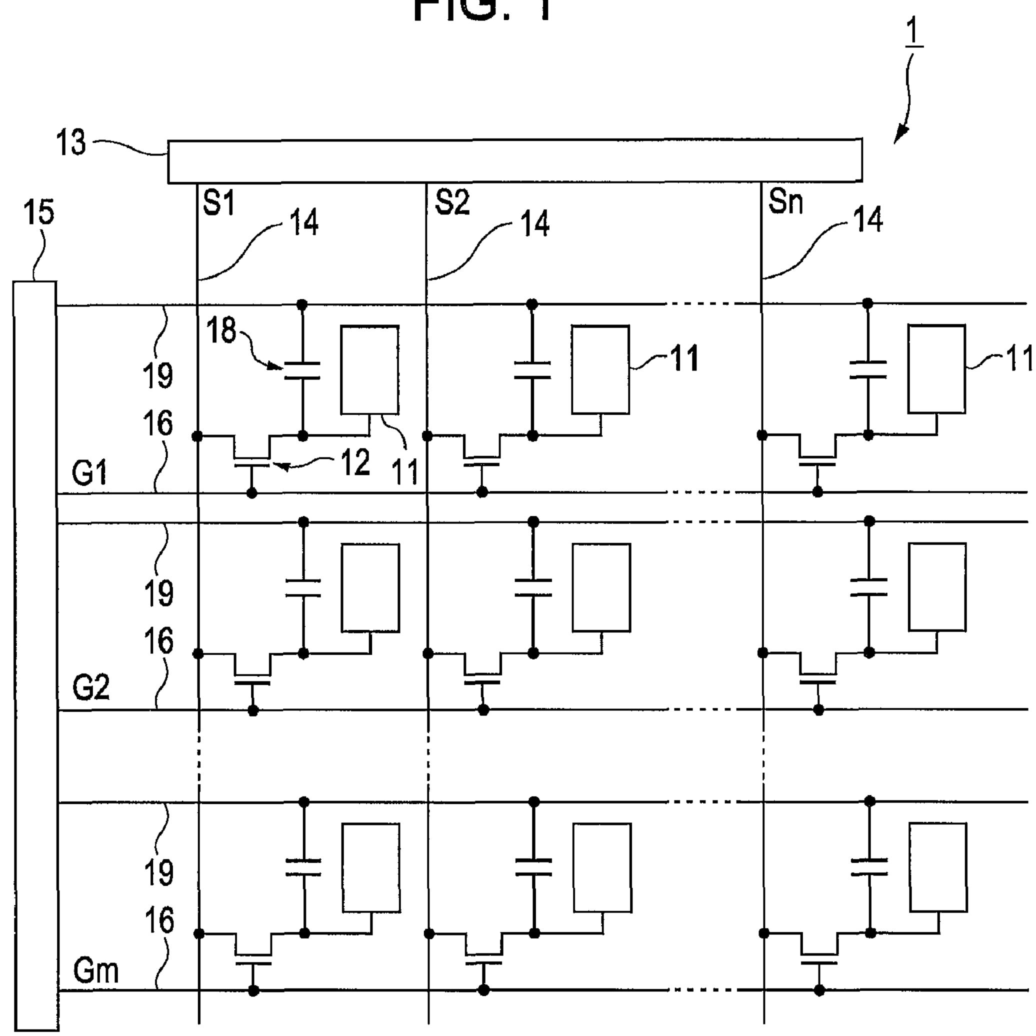
FIG. 1 is an equivalent circuit diagram of a liquid crystal device according to an embodiment of the invention.

An embodiment of the invention will now be described with reference to the drawings. For the sake of visibility, the dimensional proportions of the layers and other members in the drawings may differ as needed.

The liquid crystal device of the embodiment is of an FFS (Fringe-Field Switching) type in which three pixels respectively emitting red (R), green (G), and blue (B) lights constitute a picture element.

FIG. 1 is an equivalent circuit diagram of a liquid crystal device 1 according to the embodiment.

As shown in FIG. 1, the liquid crystal device 1 includes pixels constituting picture elements are arranged in a matrix manner. Each pixel includes a pixel electrode 11 and a TFT (thin film transistor) element 12 controlling the switching of the pixel electrode 11. The TFT element 12 includes a source connected to a data line 14 extending from a data line driving circuit 13 provided in the liquid crystal device 1, a gate connected to a scanning line 16 extending from a scanning line driving circuit 15 provided in the liquid crystal device 1, and a drain connected to the corresponding pixel electrode 11.

The data line driving circuit 13 supplies image signals S1 to Sn to the pixels through the data lines 14. The canning line driving circuit 15 supplies scanning signals G1 to Gm to the pixels through the scanning lines 16. The data line driving circuit 13 may supply image signals S1 to Sn in the ascending order of the signal numbers, or may be supplied to each group defined by a plurality of adjacent data lines 14. The scanning line driving circuit 15 supplies scanning signals G1 to Gm one after another in a predetermined timing in a pulsed manner.

When a scanning signal Gm is introduced so as to turn on the corresponding switching elements or the TFT elements 12 and keeps the TFT elements in an on-state for a predetermined period, an image signal Sn transmitted through a data line 14 is written in the corresponding pixel in a predetermined timing.

The image signal Sn at a predetermined level written in the pixel electrode 11 is held for a predetermined period between the pixel electrode 11 and the common electrode 41. In order to prevent the held image signal Sn from leaking, a storage capacitor 18 is provided so as to be connected in parallel to a liquid crystal capacitor disposed between the pixel electrode 11 and the common electrode 41. The storage capacitor 18 is disposed between the drain of the TFT element 12 and the capacitor line 19. The capacitor line 19 is not always necessary.

Figure 2:
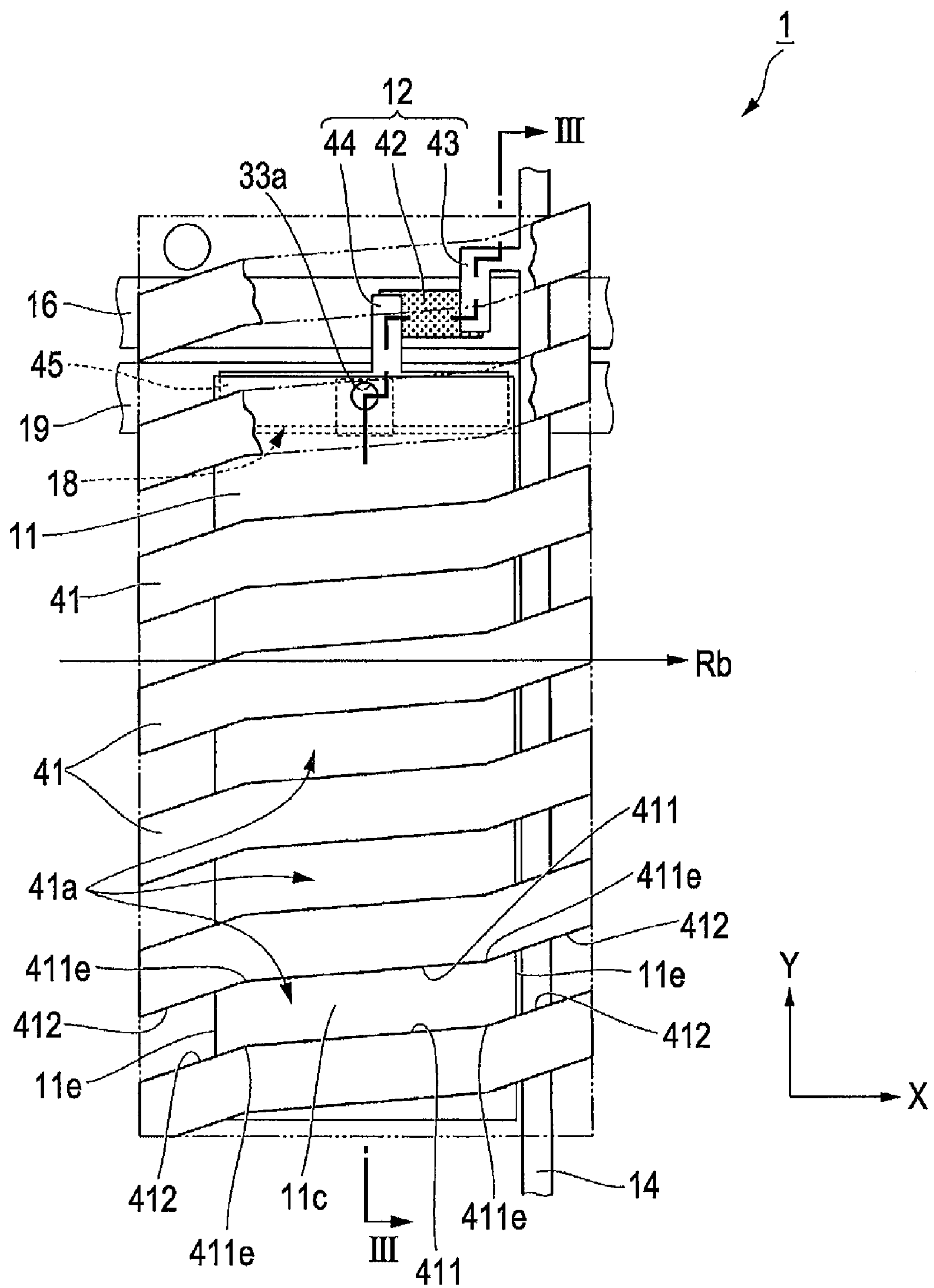
FIG. 2 is a schematic plan view of a pixel of the liquid crystal device according to the embodiment.
Figure 3:
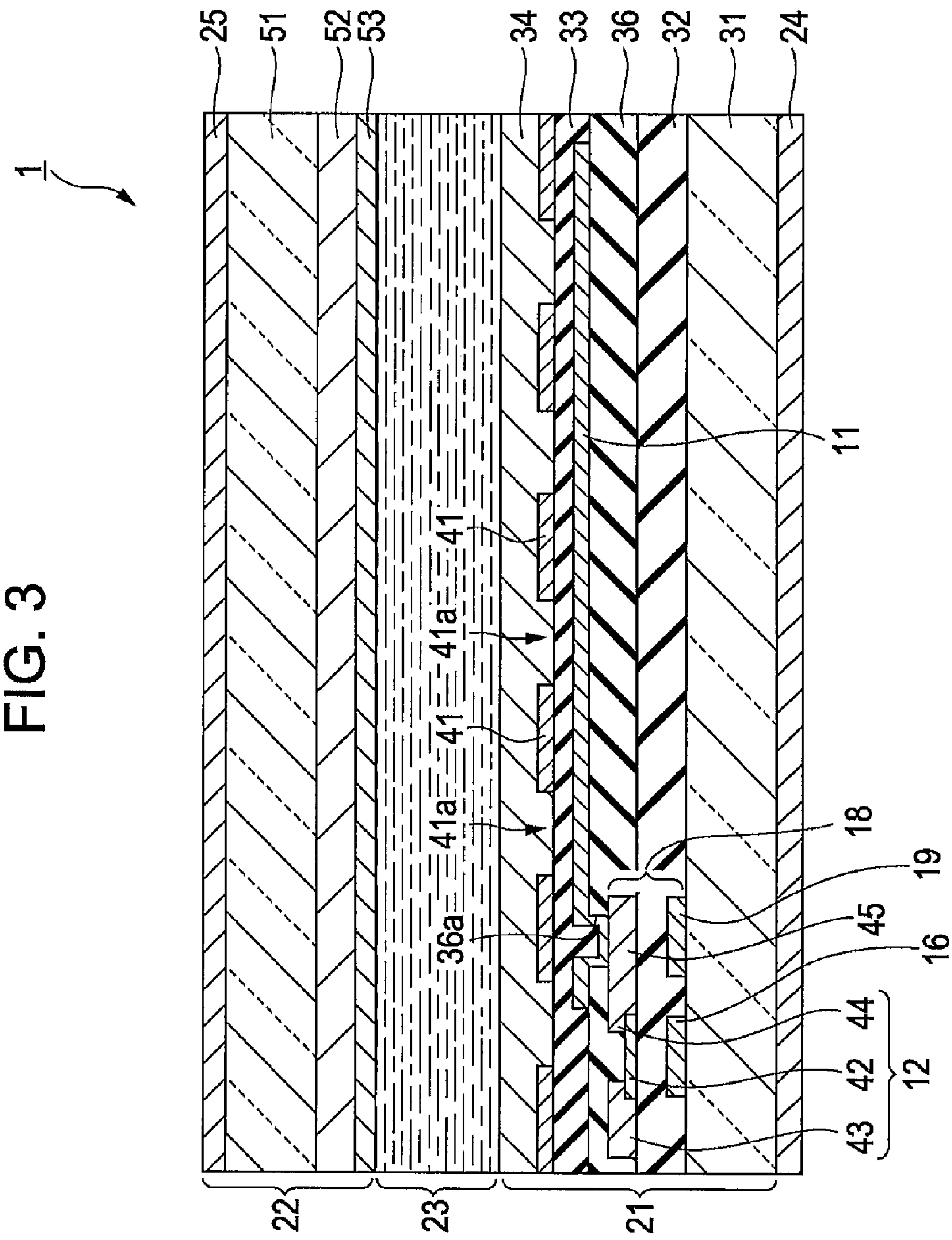
FIG. 3 is a sectional view taken along line III-III in FIG. 2.

FIG. 2 is a fragmentary enlarged plan view of one of the pixels of the liquid crystal device 1 of the embodiment. FIG. 3 is a sectional view taken along line III-III in FIG. 2. In FIG. 2, the opposing substrate 22 is omitted.

As shown in FIGS. 2 and 3, the liquid crystal device 1 of the embodiment includes an element substrate 21 and an opposing substrate 22 between which a liquid crystal layer 23 is held. The element substrate 21 includes a base 31 made of a translucent material, such as glass, quartz, or plastic. The scanning lines 16 and the capacitor lines 19 are formed on the base 31. The scanning lines 16 and the capacitor lines 19 are covered with a gate insulating layer 32 made of, for example, silicon oxide, such as $SiO_2$.

Semiconductor layers 42 overlie the scanning lines 16 on the gate insulating layer 32. In addition, the data lines 14 are formed on the gate insulating layer 32 at the boundaries extending in the longitudinal direction (Y direction) of the pixels, as shown in FIG. 2. The scanning lines 16 and the capacitor lines 19 are disposed at the boundaries extending in the lateral direction (X direction) of the pixels. The element substrate 21 has a pixel display region in which the data lines 14, the scanning lines 16, and the capacitor lines 19 extend in a grid manner so as to correspond to the pixels arranged in a matrix manner.

Each semiconductor layer 42 has a source region and a drain region. The source region is connected to a source electrode 43 diverging from the data line 14, and the drain region is connected to a drain electrode 44 diverging from the capacitor electrode 45. The semiconductor layer 42, the source electrode 43, and the drain electrode 44 define the TFT element 12. The scanning line 16 is disposed so as to oppose the channel of the semiconductor layer 42 and serves as the gate electrode of the TFT element 12.

The capacitor electrode 45 is formed in substantially a rectangular shape extending in the direction in which the capacitor line 19 extends, and overlaps the capacitor line 19 on the gate insulating layer 32. The capacitor electrode 45 and the capacitor line 19 constitute a storage capacitor 18.

The TFT element 12 and the lines or conductors are covered with an insulating layer 36 made of, for example, $SiO_2$ as shown in FIG. 3. On the insulating layer 36, the pixel electrodes 11 are formed corresponding to the respective pixels. The pixel electrode 11 is made of a transparent electroconductive material, such as indium tin oxide (ITO). The pixel electrode 11 is connected to the capacitor electrode 45 through a contact hole 33*a* reaching the capacitor electrode 45 across the insulating layer 36. The pixel electrodes 11 are covered with an interelectrode insulating layer 33.

Then, the common electrode 41 is formed on the interelectrode insulating layer 33. The common electrode 41 spreads over substantially the entirety of the pixel display region of the liquid crystal device 1 across the plurality of pixels. The common electrode 41 is made of a transparent electroconductive material, such as ITO, and has a plurality of slits 41*a*.

Each slit 41*a* has a first straight portion 411 and second straight portions 412, as shown in FIG. 2. The first straight portion 411 extends from the center 11*c* of the pixel electrode 11 toward both sides 11*e* of the pixel electrode 11, but not reaches the sides 11*e*. The second straight portions 412 extend from the respective ends 411*e* of the first straight portion 411 to the outside of the pixel electrode 11.

The common electrode 41 is covered with an alignment layer 34 made of an organic material, such as polyimide, or an inorganic material, such as silicon oxide, on the interelectrode insulating layer 33.

The upper surface of the alignment layer 34 is treated so that the alignment layer 34 can control the orientation of the liquid crystal molecules of the liquid crystal layer 23. More specifically, the alignment layer 34 is formed by applying an organic material as mentioned above so as to cover the interelectrode insulating layer 33 and the common electrode 41, followed by drying and curing, and is then subjected to rubbing. In the embodiment, the rubbing direction Rb is substantially parallel to the width direction of the pixels (X direction), as shown in FIG. 2. Consequently, the initial orientation of the liquid crystal molecules is parallel to the rubbing direction Rb of the alignment layer 34.

As shown in FIG. 3, a polarizer 24 is bonded to the external surface of the element substrate 21 (surface opposite to the liquid crystal layer 23).

The opposing substrate 22 opposing the element substrate 21 includes a base 51 made of a translucent material, such as glass, quartz, or plastic. The base 51 is provided with color filter layers 52 on the inner surface thereof (liquid crystal layer 23 side). The color filter layers 52 are arranged corresponding to the pixels. Each color filter layer is made of, for example, acrylic resin and contains a color material according to the color of the corresponding pixel.

A light-shielding layer (not shown) is formed on the color filter layers 52 in a grid manner corresponding to the regions of the data lines 14, the scanning lines 16, the capacitor lines 19, and the TFT elements 12 of the element substrate 21. The light-shielding layer and the color filter layers 52 are covered with an alignment layer 53 made of an organic material, such as polyimide, or an inorganic material, such as silicon oxide. The alignment layer 53 is subjected to rubbing in the same direction as the alignment layer 34 of the element substrate 21.

A polarizer 25 is bonded to the external surface of the opposing substrate 22 (surface opposite to the liquid crystal layer 23). The polarizers 24 and 25 have transmission axes perpendicular to each other.

A sealant (not shown) is provided along the edges of the element substrate 21 and the opposing substrate 2 to seal the liquid crystal layer 23. Thus, the liquid crystal device 1 emits light through the external surface of the element substrate 21.

Figure 4A:
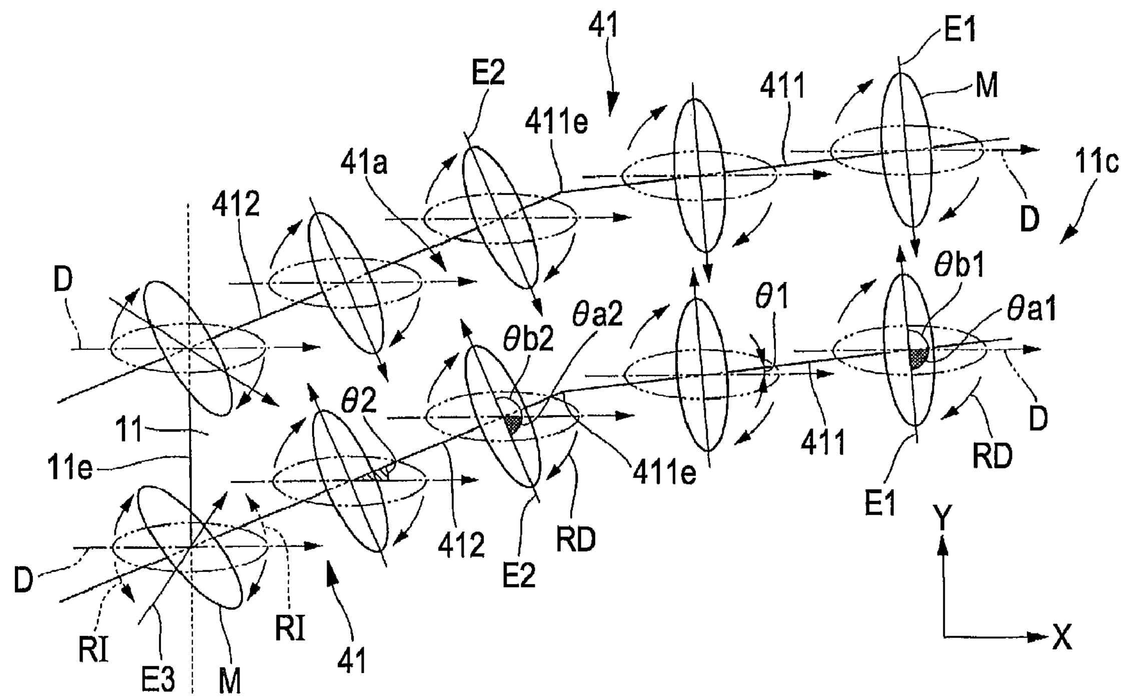
FIGS. 4A and 4B are schematic enlarged plan views of the sides of a pixel electrode in a region corresponding to a slit of a common electrode of the liquid crystal device according to the embodiment.
Figure 4B:
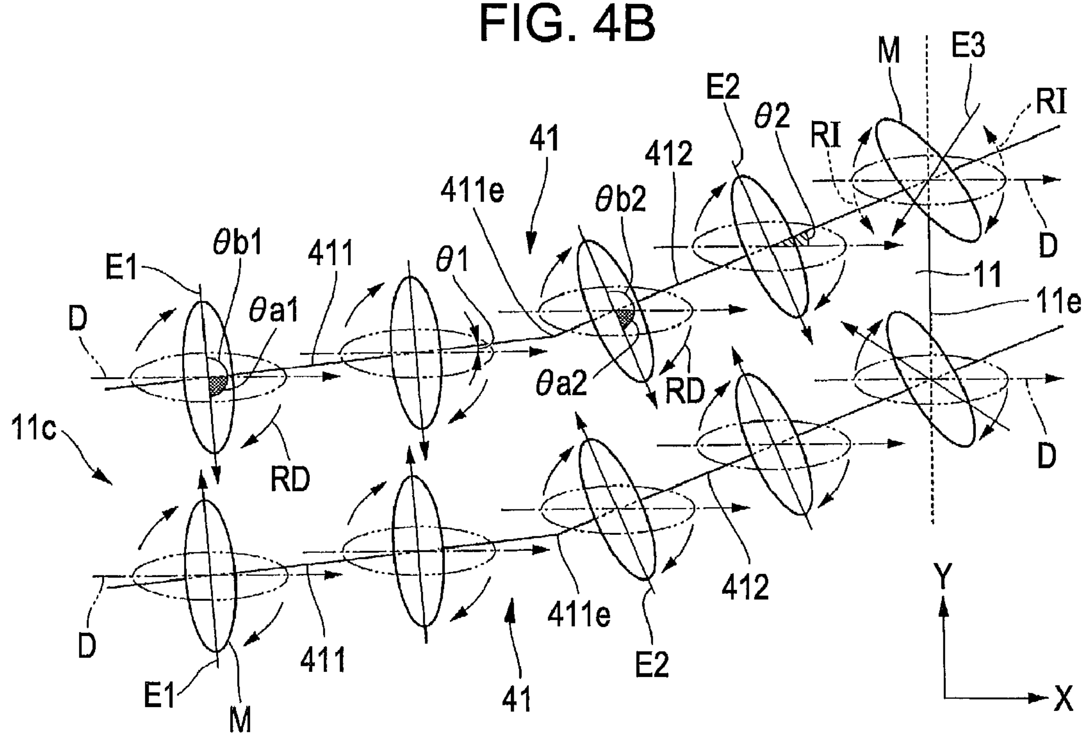
Figure 5A:
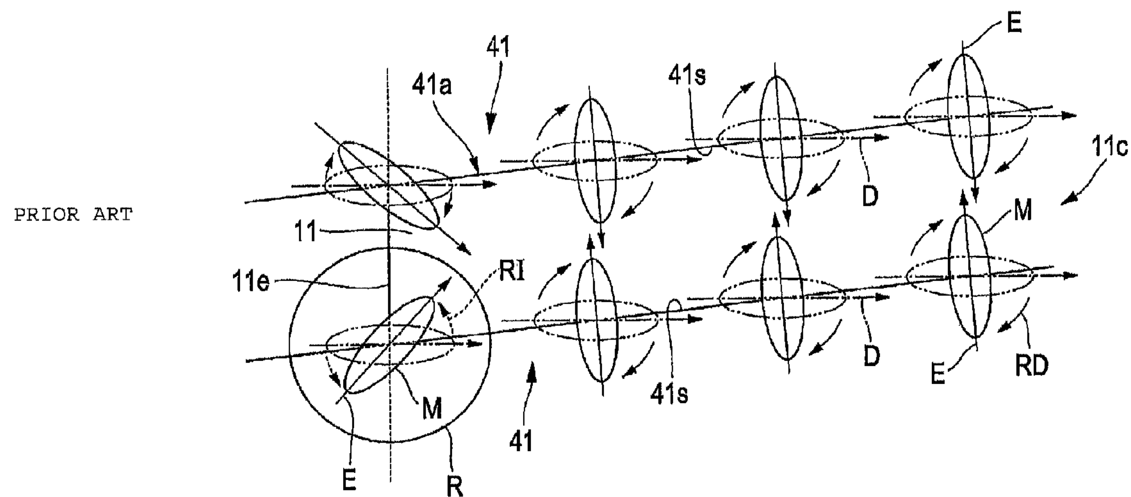
FIGS. 5A and 5B are schematic enlarged plan views of the sides of a pixel electrode in a region corresponding to a slit of a common electrode of a known liquid crystal device.
Figure 5B:
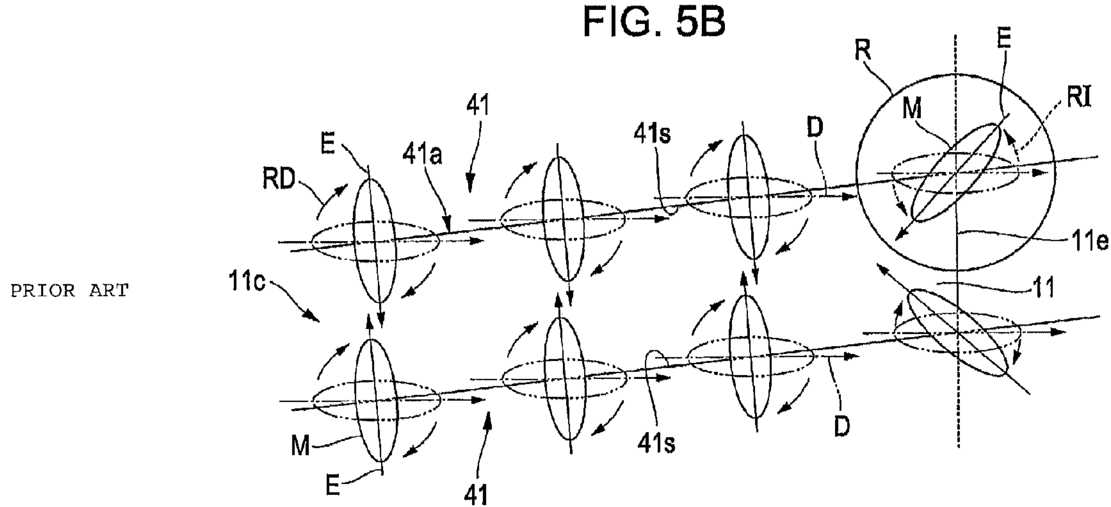

FIGS. 4A and 4B are each a schematic enlarged view of either side 11*e* of the pixel electrode 11 in the region corresponding to one of the slits 41*a* of the common electrode 41. FIGS. 4A and 4B expediently show liquid crystal molecules M of the liquid crystal layer 23.

In the liquid crystal device 1 of the embodiment, the rubbing direction Rb of the alignment layers 34 and 53 is substantially parallel to the width of the pixel (X direction), as shown in FIG. 2. Consequently, the initial orientation D of the liquid crystal molecules M is also substantially parallel to the width of the pixel (X direction), as shown in FIGS. 4A and 4B.

The pixel electrode 11 and the common electrode 41 generate electric fields E1 and E2 in directions substantially perpendicular to the directions of the first straight portion 411 and the second straight portions 412 in regions corresponding to the first straight portion 411 and the second straight portions 412 of the slits 41*a*, respectively.

When electric fields E1 and E2 are generated between the pixel electrode 11 and the common electrode 41, the liquid crystal molecules M are turned by a smaller angle θa1 or θa2 of the angles θa1 and θb1 or θa2 and θb2 formed between the initial orientation D and the electric field E1 or E2. Hence, in the embodiment, the liquid crystal molecules M are turned clockwise (in the direction RD).

The first straight portion 411 and the second straight portions 412 extend so as to form acute angles θ1 and θ2 respectively with the initial orientation D, and the acute angle θ2 is larger than the acute angle θ1.

The common electrode 41 spreads across the plurality of pixels with the slits 41*a* formed at regular intervals in the longitudinal direction of the pixel (Y direction), as shown in FIG. 2.

The thus structured liquid crystal device 1 of the embodiment produces the following effects.

As shown in FIG. 1, when a scanning signal Gm is introduced to the TFT elements 12 so as to turn on the corresponding TFT elements 12 and keeps the TFT elements 12 in an on-state for a predetermined period, an image signal Sn transmitted through the data line 14 is written in the corresponding pixel electrode 11 in a predetermined timing. The image signal Sn is held in the storage capacitor 18.

Thus, electric fields E1 and E2 are generated in the regions corresponding to the slits 41*a* of the common electrode 41 between the pixel electrode 11 and the common electrode 41, and the liquid crystal molecules M of the liquid crystal layer 23 are turned in the direction RD, as shown in FIGS. 4A and 4B.

In the liquid crystal device 1 of the embodiment, the first straight portion 411 and the second straight portions 412 extend so that the acute angle θ2 is larger than the acute angle θ1, as described above. Accordingly, the angle θa2 formed between the electric field E2 generated in the direction substantially perpendicular to the second straight portion 412 in the region corresponding to the second straight portion 412 and the initial orientation D of the liquid crystal molecules M is smaller than the angle θa1 formed between the electric field E1 generated in the direction substantially perpendicular to the first straight portion 411 in the region corresponding to the first straight portion 411 and the initial orientation D of the liquid crystal molecules M.

When electric fields E1 and E2 are generated between the common electrode 41 and the pixel electrode 11, liquid crystal molecules M turn to the direction of the electric fields E1 or E2 with an angle θa1 or θa2 as small as possible. In addition, as the turning angle θa1 or θa2 of a liquid crystal molecule M is reduced, the liquid crystal molecule M is more tightly oriented to the direction of the electric field E1 or E2.

Accordingly, the force to align the liquid crystal molecules M in the direction of the electric fields E2 in the region corresponding to the second straight portion 412 is larger than the force to align the liquid crystal molecules M in the direction of the electric field E1 in the region corresponding to the first straight portion 411. In addition, in the region corresponding to the second straight portion 412, many liquid crystal molecules M oriented in the direction substantially perpendicular to the second straight portion 412 are present in the longitudinal direction of the second straight portion 412.

In the vicinity of the overlaps between the sides 11*e* of the pixel electrode 11 and the second straight portions 412 of the common electrode 41, electric fields E3 oriented in a direction opposite to the directions of the electric fields E1 and E2 generated corresponding to the first straight portion 411 and the second straight portions 412 are generated due to the electric field generated from the pixel electrode 11 extending in the direction substantially perpendicular to the slit 41*a*. The electric fields E3 generated at the sides 11*e* of the pixel electrode 11 force the liquid crystal molecules M to rotate counterclockwise (in the direction RI) opposite to the direction RD in which the liquid crystal molecules M in the regions corresponding to the first straight portion 411 and the second straight portions 412 turn.

In the embodiment of the invention, however, the liquid crystal molecules M in the region corresponding to the sides 11*e* of the pixel electrode 11 are turned in the direction RD by a larger force than the alignment force in the first straight portion 411, and the liquid crystal molecules M present in the region corresponding to the second straight portion 412 in the longitudinal direction of the second straight portions 412 prevent the liquid crystal molecules M in the region corresponding to the sides 11*e* of the pixel electrode 11 from turning counterclockwise (in the direction RI). Consequently, the liquid crystal molecules M in the region corresponding to the sides 11*e* of the pixel electrode 11 are prevented from turning in the direction opposite to the direction RD in which the liquid crystal molecules M in the regions corresponding to the first straight portion 411 and the second straight portions 412 turn. Thus, the occurrence of a reverse tilt domain can be prevented.

Even if a reverse tilt domain is produced around the overlaps between the second straight portions 412 and the sides 11*e* of the pixel electrode 11, the liquid crystal molecules M in the region corresponding to such regions can be aligned in the direction substantially perpendicular to the direction in which the second straight portion extends by a larger force than the alignment force in the first straight portion 411. Thus, the reverse tilt domain is restricted in the vicinities of the overlap between the first straight portion 412 and the sides 11*e* of the pixel electrode 11 and is prevented from spreading, and the area of the reverse tilt domain is reduced.

The embodiment of the invention prevents or reduces the occurrence of a reverse tilt domain, and thus provides a liquid crystal device 1 that can display high-quality images.

The slits 41*a* of the common electrode 41 of the embodiment have the same shape and are arranged in the longitudinal direction of the pixels (Y direction). Thus, the slits 41*a* are formed efficiently in the common electrode 41. Consequently, the area of the slits or openings of the common electrode 41 is increased, so that many of the liquid crystal molecules M can be oriented by the electric field generated between the pixel electrode 11 and the common electrode 41. Thus, the liquid crystal device 1 can enhance the quality of displayed images.

While the invention has been described with reference to the above embodiment, it is to be under stood that invention is not limited to the disclosed embodiment and various modifications may be made without departing from the scope and spirit of the invention. For example, while in the embodiment, the slits of the common electrode extend over a plurality of pixels, the slits may be provided for each pixel. In this instance, the second straight portions of the stilts extend beyond the sides of the pixel electrode to the outside of the pixel electrode.

The first straight portion and the second straight portions may have angles in the opposite direction with the initial orientation of the liquid crystal molecules.

In addition to the slits, the common electrode may have other openings having different shapes and different angles from the slits.

The entire disclosure of Japanese Patent Application No. 2008-82828, filed Mar. 27, 2008 is expressly incorporated by reference herein.

What is claimed is:

1. A liquid crystal device comprising:

a liquid crystal layer containing liquid crystal molecules; and a pair of substrates between which the liquid crystal layer is disposed, one of the substrates including pixel electrodes corresponding to a plurality of pixels, an insulating layer covering the pixel electrodes, and a common electrode having a plurality of slits, spreading over the plurality of pixels on the insulating layer, the pixel electrodes and the common electrode generating an electric field therebetween, the electric field turning the liquid crystal molecules in a direction away from an initial orientation that is substantially to a width direction of the pixels in the regions corresponding to the slits, wherein each slit includes a first straight portion extending from a position corresponding to the center of the pixel electrode toward positions corresponding to both sides of the pixel electrode inward the region of the pixel electrode and second straight portions extending from the ends of the first straight portion to the outside of the region of the pixel electrode, and wherein the first straight portion and the second straight portions each formed an acute angle with the initial orientation in a direction opposite to the direction in which the liquid crystal molecules are turned, and the acute angle formed between the second straight portions and the initial orientation is larger than the acute angle formed between the first straight portion and the initial orientation.

2. The liquid crystal device according to claim 1, wherein the direction of the electric field in the region corresponding to the first straight portion is substantially perpendicular to the direction in which the first straight portions extend, and the direction of the electric field at least at the first straight portion side in the regions corresponding to the second straight portions is substantially perpendicular to the direction in which the second straight portions extend.

3. The liquid crystal device according to claim 1, wherein the slits have the same shape and are arranged at regular intervals in the direction substantially perpendicular to the initial orientation.

* * * * *